Nov. 11, 1941.                 A. ADAMS                 2,262,717
                        REFRIGERATING APPARATUS
                       Filed March 16, 1940        2 Sheets-Sheet 1
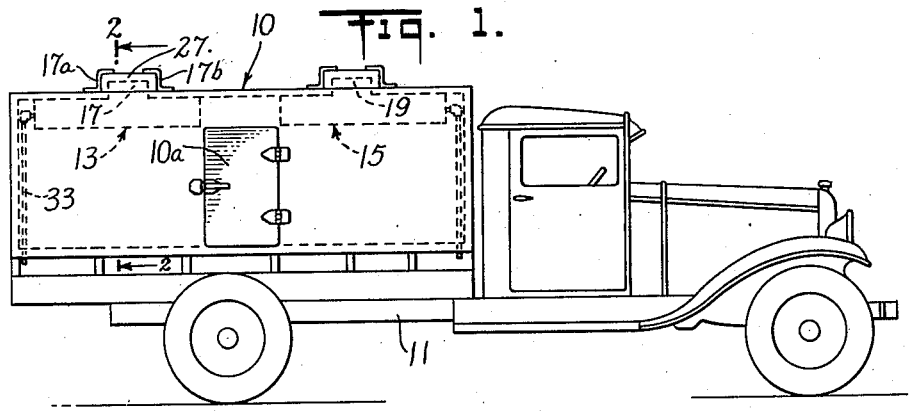
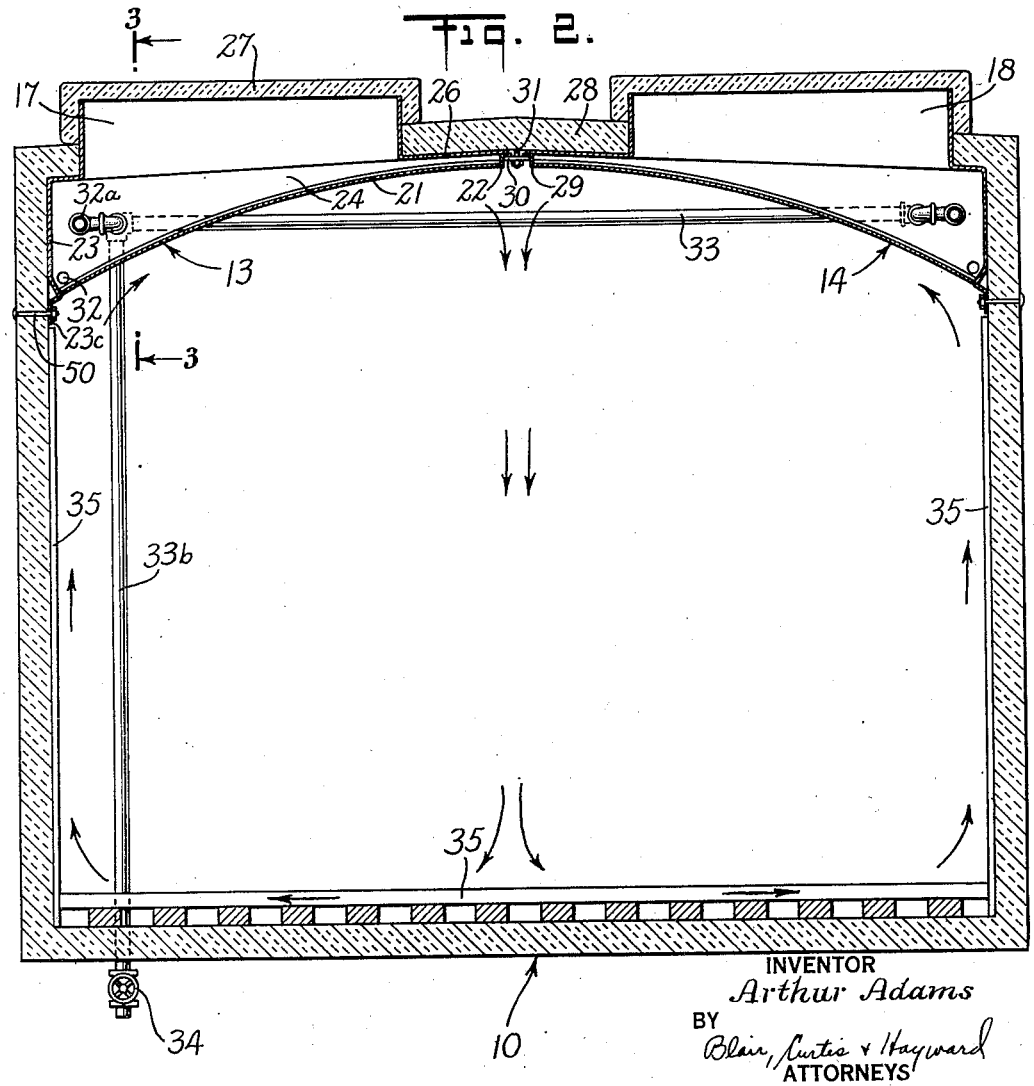
INVENTOR
*Arthur Adams*
BY
*Blair, Curtis & Hayward*
ATTORNEYS Nov. 11, 1941.  A. ADAMS  2,262,717
REFRIGERATING APPARATUS
Filed March 16, 1940  2 Sheets-Sheet 2
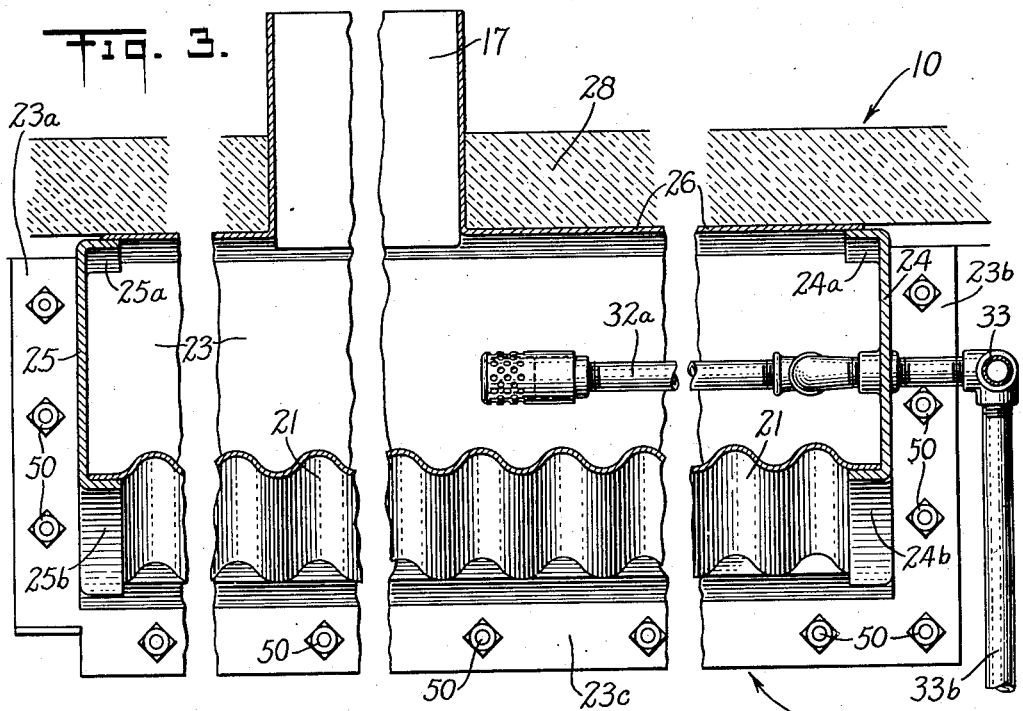
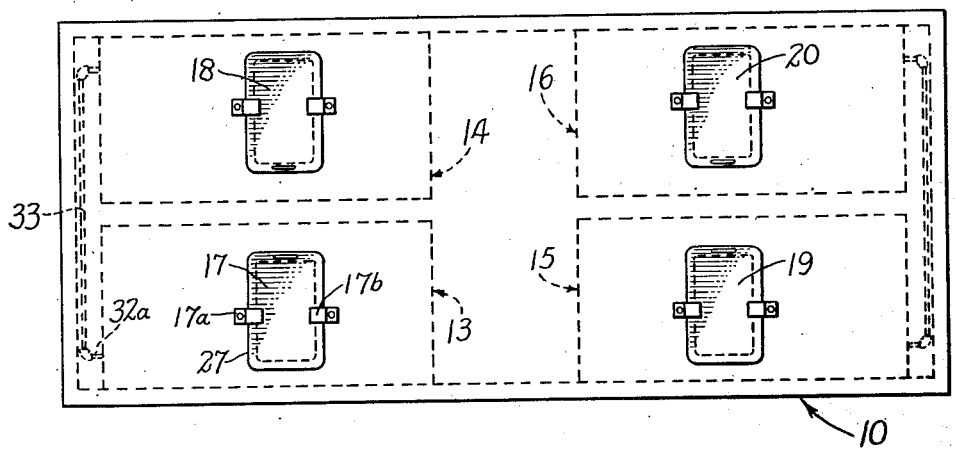
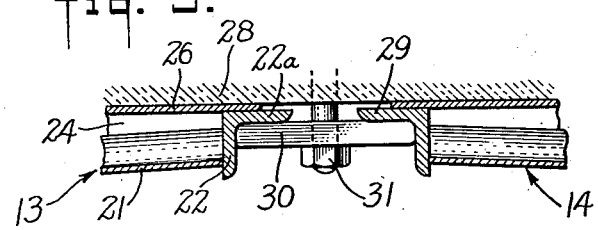
INVENTOR
Arthur Adams
BY
Blair, Curtis + Hayward
ATTORNEYS Patented Nov. 11, 1941

2,262,717

UNITED STATES PATENT OFFICE 2,262,717

REFRIGERATING APPARATUS

Arthur Adams, Brooklyn, N. Y., assignor to Flakice Corporation, Brooklyn, N. Y., a corporation of Delaware Application March 16, 1940, Serial No. 324,245

3 Claims. (Cl. 62—13)

This invention relates to refrigerating apparatus for use in a truck or the like.

An object of this invention is to provide in an improved combination a truck body and a refrigeration system.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the drawings, wherein like reference characters refer to corresponding parts throughout the several views, Figure 1 is a side elevation of a truck in which is installed apparatus embodying the principles of the present invention;

Figure 2 is a vertical section taken along the line 2—2 of Figure 1;

Figure 3 is a vertical section taken along the line 3—3 of Figure 2;

Figure 4 is a top plan view of the body of the truck shown in Figure 1; and

Figure 5 is an enlarged view of a portion of the section shown in Figure 2.

In order that certain features of this invention may be better understood, it might here be pointed out that one method of refrigerating truck bodies is to use mechanical refrigeration units. These units are expensive to install and must be continuously checked and repaired by mechanics if they are to be kept in efficient operating condition. Thus if one uses mechanical refrigeration units, one incurs not only large original but also large maintenance expenses.

Another method of refrigerating truck bodies is to install ice bunkers in some part of the loading space of the bodies. Difficulty with this type of bunker is experienced because the height of truck bodies is limited by low bridges under which trucks must be designed to pass. This height limitation in truck bodies materially affects their carrying capacity, and ice bunkers within the truck bodies are objectionable in that they further reduce this carrying capacity. A further difficulty in the use of ice bunkers results from the fact that they interfere with the work of the men who load and unload the truck body and thus reduce their efficiency. Another object of this invention is to overcome the above objections, as well as many others.

Referring now to Figure 1 of the drawings, a truck body generally indicated at 10 is mounted upon any suitable truck chassis 11. The body comprises bottom, top, side, and end walls, all being of insulated construction, and a suitable entrance opening, such as door 10a. Within the top portion of the body are four ice bunkers, generally indicated at 13, 14, 15, and 16 (Figures 2 and 4). These bunkers are provided with filling openings 17, 18, 19, and 20, and are adapted to hold a mixture of ice and water for refrigerating the truck body, all as will be described more fully hereinafter.

As the construction of bunkers 13, 14, 15, and 16, and their filling openings 17, 18, 19, and 20 are substantially similar, the description will be limited to bunker 13. As may be best seen in Figures 2 and 3, bunker 13 comprises a bottom wall 21, side walls 22 and 23, end walls 24 and 25 and top wall 26.

Bottom wall 21, which is preferably made from corrugated sheet metal (Figure 3), forms an arch between and is secured to side walls 22 and 23 (Figure 2). End walls 24 and 25 (Figure 3) have inwardly extending flanges 24a, 25a, 24b, and 25b formed thereon, which extend under and are secured to bottom wall 21 and top wall 26. The other edges of end walls 24 and 25 and of top wall 26 are secured to side walls 22 and 23. All of the joints between the walls described hereinabove are water tight and may be made in any suitable manner, such as by welding.

As best seen in Figures 2 and 3, filling opening 17 is preferably made of sheet metal, which is joined to the top wall 26 of the bunker, and extends through and above the insulated top of the truck. The opening is covered by a hatch 27 of insulated construction which may be secured in position thereover by angle irons and lag bolts 17a and 17b (Figure 4).

Ice bunker 13, as shown in Figures 3 and 5, is supported by flanges 23a, 23b, and 23c, which extend out from the sides and bottom of end wall 23, and by flange 22a, which extends outwardly from end wall 22 adjacent the top 28 of truck body 10. Bolts 50 (Figure 3), which pass through flanges 23a, 23b, and 23c, and through the side walls of the truck, firmly secure the outer portion of the ice bunker in its proper position in the truck body.

Considering now Figures 2 and 4, two ice bunkers are positioned within the truck body to form an ice bunker unit. The outer portions of the bunkers are supported by the flanges described hereinabove, and the center portions are supported by flanges 22a and 29 (Figure 5), which are formed on the side walls of the bunkers. A plate 30 (Figures 2 and 5) positioned in the channel formed by the flanges 22a and 29 and the side walls of the bunkers serves to fasten the flanges to the top of the truck to which the plate is secured by bolts, one of which is shown at 31. Thus, this plate, acting through flanges 22a and 29, supports the inner portions of the ice bunker unit.

Referring now to Figures 2 and 5, it may be seen that plate 30 extends between and contacts the side walls of the bunkers which form an ice bunker unit. Thus, plate 30 serves two purposes, being both a bearing plate for bolt 31 and a keystone to complete the arch formed by the bunkers between the side walls of the truck—a type of construction which results in obtaining maximum strength so that the bunkers are well adapted to carry the loads which in use are placed in them. It is to be noted that having the bunkers in two sections provides another advantage—namely, permitting the bunker unit to be made in parts of a size which may be moved into or taken out of a truck body through doors of limited size. Thus the bunker construction disclosed hereinabove, in addition to being of strong and durable design, is adapted to be easily and quickly installed in a truck body.

A drainage system is provided for the bunkers which both permits the water level therein to be reduced during re-icing and also permits the bunkers to be drained when the refrigeration system is not in use. To accomplish the former, each ice bunker unit comprising two bunkers is preferably connected by a pipe 33 (Figures 2 and 3). Pipe 33 has extensions secured thereto which extend into and are spaced from the bottoms of the bunkers, one of which is shown at 32a (Figure 3). Leading downwardly from connecting pipe 33 is a drainage pipe 33b, having a valve 34 under the truck body which permits drainage from the bunkers to be regulated. To accomplish complete drainage of the bunkers, removable plug 32 (Figure 2) is positioned in the lowermost portion of the bunker.

In use, the drainage system is opened when the bunkers are being re-iced. As the ice is placed in a bunker, the excess water is removed, preventing its overflow through the filling opening. It should be noted that the drainage pipes are spaced above the bottom of the bunkers. This permits a certain amount of water to remain in the bunkers, which acts as a heat conducting medium between the ice in the bunker and its corrugated heat-absorption surface. This ice water covers the entire heat-absorbing surface of the bunkers and its temperature is maintained at 32° F. as long as there is an appreciable quantity of ice in the bunkers. Furthermore, movement of the truck aids circulation of the water in the bunkers, and while there is ice therein, the corrugated heat-absorbing surface is maintained at a temperature slightly above 32° F., continually absorbing heat from the air. Thus, the heat in the interior of the truck body passes through the corrugated surface of the bunkers, through the ice water, and thence into the ice.

By the above arrangement of the bunkers, a useful and novel air circulation is obtained within the truck body when a cold load is placed therein. Referring to Figure 2, the side walls and the bottom of the truck body have slats 35 extending transversely thereof. When the truck body is loaded, these slats permit the circulation of the air as indicated by the arrows in Figure 2. The heat leaking through the side walls of the truck flows upwardly between slats 35 to the corrugated surfaces of the bunkers, the curving surfaces of which are designed to present maximum heat-absorption surface. The air circulation follows the arched form of these surfaces to the center portions of the bunker, where, being cooled by contact with the heat-absorbing surface of the bunkers, it becomes heavy enough to drop through the load to the floor. Upon reaching the floor, the air circulation flows outwardly toward the side walls, absorbing heat leaking through the floor of the truck body. Upon reaching the side walls, it flows upwardly to the bunkers. Thus, this air circulation picks up the heat leaking through the floor and sides of the truck body, and the bunkers prevent leakage through the protected top of the body so that the load is protected from heat leaking through the truck body.

Thus, a refrigeration system for a truck body is provided by which the interior of a truck body may be efficiently and inexpensively refrigerated. Furthermore, bunkers are used which are so positioned and designed that they do not materially decrease the storage space within the body, and, at the same time, maximum head room is provided for men working therein. The arched shape of the bunkers provides maximum load carrying strength, while, since these bunkers are of simple and inexpensive construction, they may be easily and quickly installed in a truck body. In addition, the air circulation within the body effectively protects the load and is adapted to maintain it at a constant temperature. It will thus be seen that there is provided a construction of an essentially practical nature in which the several objects of this invention are attained.

As many possible embodiments may be made of the above invention without departing from the scope thereof, it is to be understood that all matter herein set forth or shown in the accompanying drawings is to be interpreted as illustrative and not in a limiting sense.

I claim:

1. In refrigerating apparatus for use in a truck or other moving vehicle, in combination, a storage chamber, an ice bunker unit comprising a pair of ice bunkers positioned in the upper portion of said storage chamber and having their lower surfaces arched, and a plate member, said plate member being positioned between the juxtaposed edges of said bunkers and forming a connecting member between their edges whereby said bunkers, through said plate, form an arch between the side walls of said truck body.

2. In refrigerating apparatus for use in a truck or other moving vehicle, in combination, a storage chamber, an ice bunker unit comprising a pair of ice bunkers, said bunkers being positioned in the upper portion of said storage chamber and having their lower surfaces corrugated and arched, means supporting the portions of said bunkers adjacent the side walls of said truck, and means positioned between the juxtaposed side walls of said bunkers for supporting the inner portions of said bunkers, said last-mentioned means forming a connecting member between said bunker side walls to complete an arch between the side walls of said truck.

3. In refrigerating apparatus for use in a truck or other moving vehicle, in combination, a storage chamber, an ice bunker unit comprising a pair of ice bunkers positioned in the upper portion of said storage chamber, said bunkers extending outwardly from the side walls of said vehicle and having their lower surfaces arched, corrugations formed in the arched lower surfaces of said bunkers which follow the curve thereof, and a plate member, said plate member being positioned between the juxtaposed edges of said bunkers and forming a connecting member between these edges, whereby said bunkers, through said plate, form an arch between the side walls of said truck body.

ARTHUR ADAMS.